No. 616,935. Patented Jan. 3, 1899.
G. W. KENT.
SAW SETTING MACHINE.
(Application filed Nov. 15, 1897.)

(No Model.) 2 Sheets—Sheet I.

Witnesses
John S. Gould
Rockwood Hoar

Inventor
George W. Kent
by Aldus C. Higgins, his
Asso. Attorney

No. 616,935. Patented Jan. 3, 1899.
G. W. KENT.
SAW SETTING MACHINE.
(Application filed Nov. 15, 1897.)
(No Model.) 2 Sheets—Sheet 2.

Witnesses
George W. Kent, Inventor
by Aldus C. Higgins his Attorney

THE NORRIS PETERS CO., PHOTO-LITHO., WASHINGTON, D. C.

UNITED STATES PATENT OFFICE.

GEORGE W. KENT, OF LEOMINSTER, MASSACHUSETTS.

SAW-SETTING MACHINE.

SPECIFICATION forming part of Letters Patent No. 616,935, dated January 3, 1899.

Application filed November 15, 1897. Serial No. 658,617. (No model.)

*To all whom it may concern:*

Be it known that I, GEORGE W. KENT, residing at Leominster, county of Worcester, State of Massachusetts, have invented new and useful Improvements in Saw-Setting Machines, of which the following is a specification.

This invention relates to devices for setting the teeth of a saw, the saw being held firmly in a vise, while by the rotation of a shaft dies are actuated to set the teeth and mechanism operated whereby the saw is automatically fed through the machine. Its object is to provide a saw-setting machine which shall be extremely simple, durable, capable of ready and varied adjustment and of positive and even action.

Figure 1:
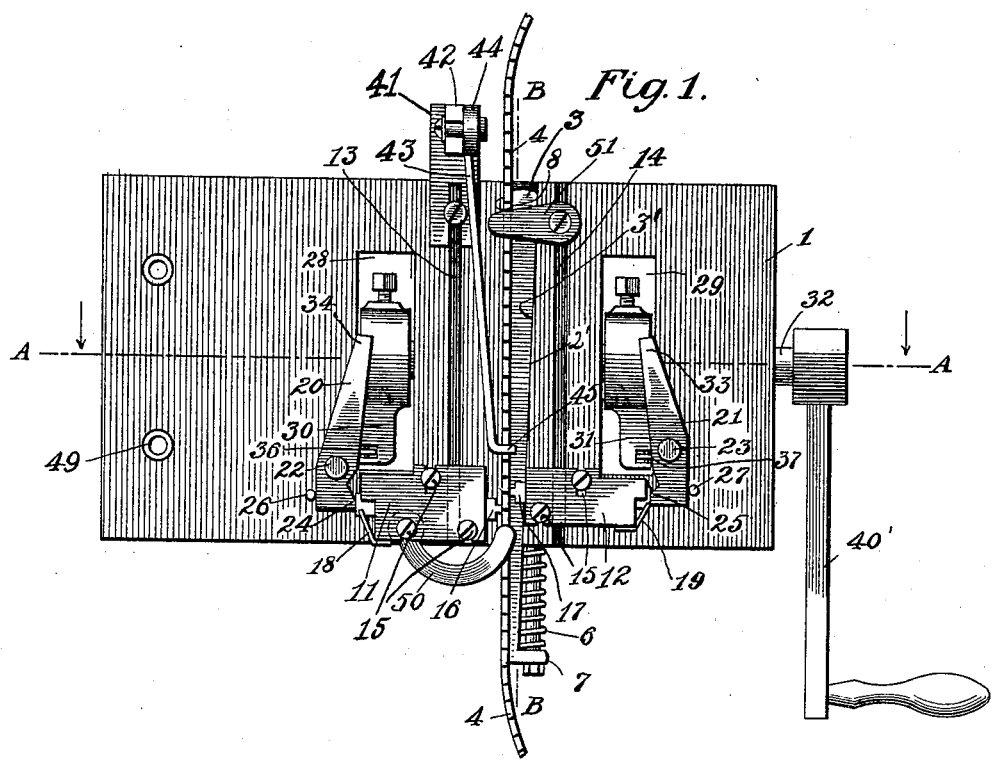
Figure 2:
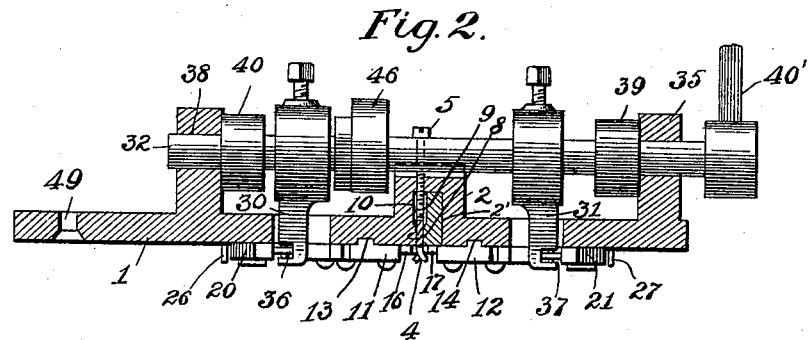
Figure 3:
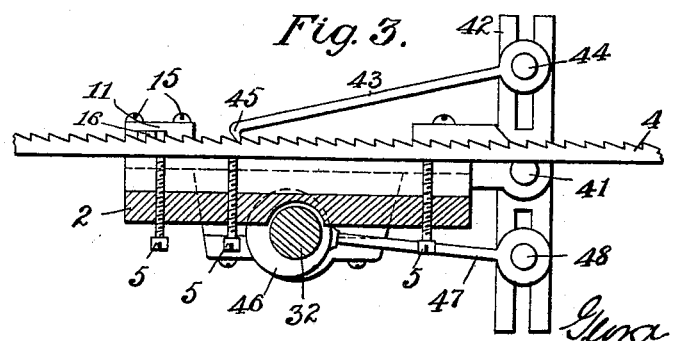
Figure 4:
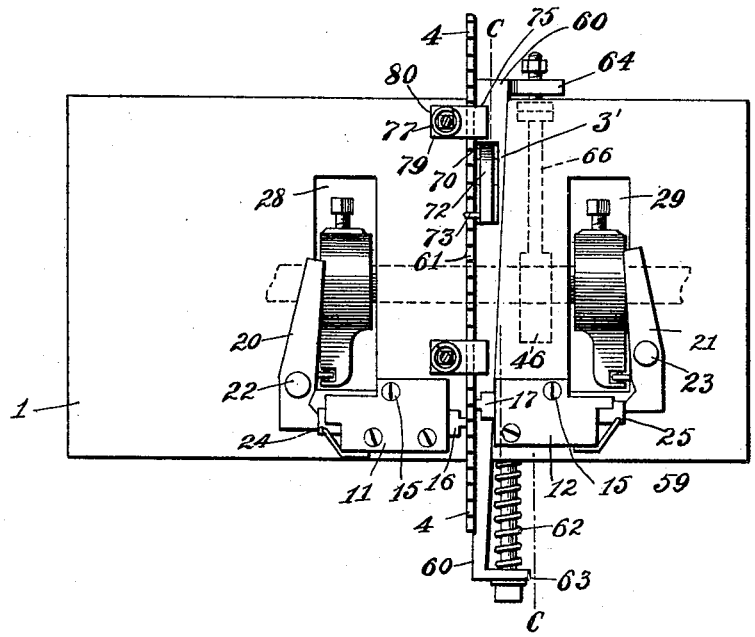

In the accompanying two sheets of drawings, Figure 1 is a plan view of a machine constructed according to my invention. Fig. 2 is a sectional view on the line A A of Fig. 1 in the direction of the arrow-points and showing the cam-arms engaging the lever-arms. Fig. 3 is a sectional view on the line B B of Fig. 1, showing one form of feeding mechanism. Fig. 4 is a plan view showing a modified form of feeding mechanism and other modifications, and Fig. 5 is a sectional view on the line C C of Fig. 4.

My machine is particularly adapted for setting the teeth of band-saws. The saw is placed in the machine and held positively and firmly in position by a vise, the fixed jaw of which is formed on one side of a wedge-shaped slot in the bed or base plate of the machine and the movable jaw made wedge-shaped to fit the slot and actuated by a single spiral spring, which forces it into the slot formed in the base-plate, clamping the saw firmly. This form of vise allows the saw to be fed through it without special releasing mechanism, the saw being moved by the feeding mechanism in a direction against the action of the spring, moving the jaw out of its recess in the bed just far enough to allow the saw to be moved the desired distance, whereupon the vise acts again to hold the saw firmly to be set. The teeth are given the proper clearance or set by setting jaws or dies with beveled faces operating on opposite sides of the saw upon adjacent teeth. These dies slide in adjustable blocks and are moved against the teeth by lever-arms, which are actuated by adjustable cam-arms on the driving-shaft. This method of crowding the teeth over has been found to produce results greatly superior to the method of striking the teeth a blow, as is common in some machines. As saws are not of even temper throughout and of exactly uniformly-shaped teeth the blows of a punch or hammer will set those teeth which are softer too far and those of a harder temper not far enough, and in the latter case a sharp blow would subject them to the danger of breakage.

Figure 5:
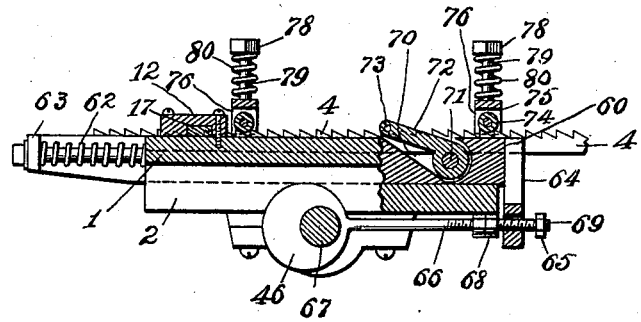

The feeding mechanism comprises, in one modification, a swing-arm operated by an eccentric on the shaft, to the upper end of which is adjustably pivoted an arm to engage the teeth, as shown in Fig. 3, or the feeding mechanism shown in Figs. 4 and 5 may be adopted. This consists of a dog pivoted to the movable jaw of the vise and adapted to engage the teeth of the saw. An arm adjustably attached to an extension of the movable jaw is attached at its other end to an eccentric on the shaft. In this case the jaw is positively moved to release the saw, at the same time feeding it.

The adjustable features of the device include the screw adjustment for regulating the height of the saw, the adjustment of the die-holding blocks independent of the operating mechanism to accommodate the pitch of the saw, the adjustment on the shaft of the cam-arms which engage the lever-arms to regulate the amount or degree of set, the adjustment of the feeding mechanism shown in Fig. 3, by means of which the saw may be fed the proper distance whatever its pitch, and in the modification shown in Figs. 4 and 5 the adjusting-nuts on the eccentric-shaft to accomplish the same purpose.

The means for holding the saw down in place when the vise is released may consist of ordinary flat springs (shown in Fig. 1) or spring-actuated blocks, with or without rollers, as shown in Figs. 4 and 5.

Referring in detail to the drawings, 1 denotes the base-plate of the machine, which is made thicker at 2 to allow for the slot which accommodates the movable wedge-shaped holding-jaw 3 and to provide for the fixed jaw 8, between which and the movable jaw the saw 4 is held. The saw rests on the adjusting-screws 5, passing through this thicker part of the base-plate.

The movable wedge-shaped jaw slides in a wedge-shaped groove or slot 2' in the base-plate, and by means of the spiral spring 6 acting between the edge of the base-plate and the angular or bent end 7 of the movable jaw forces said jaw into the slot, the angular side 3' of said jaw bearing against and sliding along the angular side of the slot opposite the fixed jaw and compelling the lateral movement of the movable jaw toward the fixed jaw. By pushing the movable jaw against the force of the spring the saw can be introduced between it and the fixed jaw 8, which is integral with the base-plate. The saw is thereby held very firmly and positively, but can be moved by the feeding mechanism, hereinafter described, in the direction against the force of the spring 6. Leaving sufficient gripping-surface on the jaws where they grasp the saw to hold the latter firmly, said jaws are cut away at 9 and 10 to allow space for the adjusting-screws 5, which are adjusted according to the width of the saw.

The flat springs 50 and 51 are provided to hold the saw firmly down on the adjusting-screws.

Fastened upon the top of the base-plate are the blocks 11 and 12, which are adjustable in the grooves 13 and 14 and are held by the screws 15. Sliding in these blocks are the setting jaws or dies 16 and 17, which are adjusted to set adjacent teeth to the right and left when forced together. These dies are beveled where they come in contact with the saw-teeth to set said teeth, as shown in Fig. 2. The blocks in which these dies slide are made adjustable, as shown and described above, to enable the dies to be adjusted for saws of different pitch or distance the teeth are placed apart. The dies are normally held away from the saw by means of the springs 18 and 19.

The lever-arms 20 and 21 are pivoted at 22 and 23, and the ends 24 and 25 of said levers engage the dies to push them against the saw-teeth. They are held normally in position against the stops 26 and 27 by the springs which hold the dies in normal position.

In the base-plate 1 slots 28 and 29 are cut, through which the cam-arms 30 and 31, fixed adjustably on the shaft 32, extend when said shaft is revolved. The ends 34 and 33 of the lever-arms 20 and 21 extend over said slots to be engaged by said cam-arms, as shown in Fig. 2. Said cam-arms are provided with non-friction rollers 36 and 37 and are adjustable on the shaft in order to regulate the amount of set. The shaft 32 is journaled in bearings 35 and 38 on the base-plate and provided with collars 39 and 40 and crank 40'. To the base-plate is also attached the block 41, to which is pivoted the rocker-arm 42. Adjustably connected at 44 to the upper end of this arm is the feeding-arm 43, provided with a bent end 45, which engages the teeth of the saw to feed it along between the times when the setting-dies are acting. An eccentric 46, connected with the shaft, actuates an eccentric-arm 47, which is adjustably connected to the rocker-arm at 48 and causes the rocker-arm to move the feeding-arm and thereby to advance the saw when the dies are in their normal position.

The device can be attached to a base or stand by the extension 49 of the base-plate or can be attached to the saw-table itself in such a manner that the saw can be set without removing it from the machine.

The modification shown in Figs. 4 and 5 illustrates a different means for feeding the saw and also for holding it down on the screws. With the exception of the changes described below the device is the same as that already described and shown in Figs. 1 and 2.

In Figs. 4 and 5 the movable wedge-shaped jaw is denoted by 60 and the fixed jaw in the base-plate by 61. Within a recess 70 in the side of the movable jaw at 71 is pivoted the dog 72, which carries the pin 73 to engage the teeth of the saw. The jaw is actuated, as shown in the other figures, by the spiral spring 62 acting between the side 59 of the base-plate and the bent end 63. The other end of the movable jaw is bent down and extended to one side at 64. Through this extended end at 65 runs loosely the eccentric-arm 66, connected to the eccentric 67, mounted on the shaft. This eccentric-arm is provided with nuts 68 and 69, which are adjustable along the arm. The eccentric is so placed on the shaft and the nuts so adjusted that after the action of the setting-dies the wedge-shaped jaw is moved back, releasing the saw and advancing it with the jaw. The means for holding the saw in its new position and down on the adjusting-screws consists of a block 75, which is preferably slotted at 74 and provided with a roller 76. The extension of this block is provided with a square hole 77, fitting a pin 78, also square at its lower end, but round above the block at 79, so that while the block is held in its lower position from turning, yet upon being raised it may be turned to allow the saw to be put in and removed. A spiral spring 80 holds the block down on the saw, and this pressure, the sides of the slot, and the rollers prevent the saw from becoming misplaced when the vise is released. I preferably use two of these holding devices, as shown in Fig. 5. This holding device may be used in the form of my machine shown in Fig. 1, or the springs shown there may be used in the modification just described.

I am aware that many changes may be made in my saw-setting machine by those skilled in the art without departing from the spirit and scope of my invention as described. I therefore do not intend to be limited to the construction I have shown and described; but What I do claim, and desire to secure by Letters Patent of the United States, is—

1. In a device of the class described, the combination of a base-plate, a clamping or holding vise for the saw, formed in said plate, blocks mounted on the base-plate on opposite sides of said saw, and adjustable to the pitch of the saw, setting jaws or dies slidable in said blocks, means for normally holding said dies away from the saw-teeth, lever-arms adapted to act against said dies to set the teeth, adjustable cam-arms adapted to engage the lever-arms to actuate the latter, and an operating-shaft upon which said cam-arms are adjustably mounted, substantially as described.

2. In a device of the class described, the combination with a clamping or holding vise for a saw comprising a pair of jaws, spring actuating means to cause longitudinal jaw movement, and bearing means for compelling lateral jaw movement, of setting-dies adjustable to the pitch of the saw, lever-arms to operate the setting-dies, and means for actuating the lever-arms, substantially as described.

3. In a device of the class described, the combination of a base-plate, a clamping or holding vise comprising a fixed jaw, a movable jaw slidable against an angular bearing and actuated by a spring; means to regulate the height of the saw in the vise, blocks independently adjustable of the operating mechanism, dies slidable in said blocks, lever-arms to act against said dies, an operating-shaft, cam-arms mounted on said shaft to engage the lever-arms, and an adjustable automatic feeding mechanism operated by an eccentric on said shaft, substantially as described.

4. In a device for clamping or holding a saw, the combination with a fixed jaw, of a movable jaw, means to force said movable jaw longitudinally of the fixed jaw, and angular bearings to compel the said movable jaw to be forced laterally by said means, substantially as described.

5. In a device for clamping or holding a saw, the combination with a fixed jaw, of a movable wedge-shaped jaw adapted to slide longitudinally of the saw, a bearing for said movable jaw opposite the fixed jaw, to compel said movable jaw to be forced laterally against the fixed jaw, and a spring for sliding said movable jaw, substantially as described.

6. In a device for clamping or holding a saw, the combination of a base-plate, a fixed jaw formed therein, upon one side of a wedge-shaped slot cut therein, a movable wedge-shaped jaw slidable in said slot and bearing on its angular side against the angular side of the slot away from the fixed jaw, and a spring for sliding the movable jaw, substantially as described.

7. In a device of the class described, the combination of a base-plate, a clamping or holding vise comprising a fixed jaw formed on one side of a wedge-shaped slot in said base-plate, a movable wedge-shaped jaw fitting said slot, and a spring for actuating said movable jaw; adjustable blocks carrying movable setting-dies, lever-arms, cam-arms, an operating-shaft upon which said cam-arms are mounted, and an automatic feeding mechanism comprising a dog mounted in the movable jaw and adapted to engage the saw-teeth, an arm adjustably connected to the movable jaw, and an eccentric on the shaft to which said arm is connected; and holding devices to prevent displacement of the saw when the vise is released, substantially as described.

8. In a device of the class described, a feeding mechanism comprising the combination of a movable jaw, a dog mounted on said jaw, and operated by the movement of the jaw, an operating-shaft, an eccentric on said shaft, and an adjustable connection from said eccentric to said movable jaw, substantially as described.

9. In a device of the class described, a spring holding mechanism comprising the combination of a pin made square at the lower end and round at the upper end, a slotted block mounted on said pin through a square hole fitting the square portion of said pin, and adapted to turn when raised to the round upper end, a roller mounted in the slot, and a spiral spring for holding said block on the saw, substantially as described.

GEORGE W. KENT.

Witnesses:
CHARLES R. EDGELL,
FRANK B. EDGELL.